United States Patent
Cebulla et al.

(10) Patent No.: US 9,274,545 B2
(45) Date of Patent: *Mar. 1, 2016

(54) APPARATUS AND METHOD TO RECOVER A DATA SIGNAL

(71) Applicant: GLOBALFOUNDRIES INC., Grand Cayman (KY)

(72) Inventors: Markus Cebulla, Stuttgart (DE); Rolf Fritz, Waldenbuch (DE); Cédric Lichtenau, Stuttgart (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 79 days.

This patent is subject to a terminal disclaimer.

(21) Appl. No.: 14/061,976

(22) Filed: Oct. 24, 2013

(65) Prior Publication Data

US 2015/0121116 A1 Apr. 30, 2015

(51) Int. Cl.
*H04J 3/06* (2006.01)
*G06F 1/12* (2006.01)
*G06F 11/20* (2006.01)

(52) U.S. Cl.
CPC .............. *G06F 1/12* (2013.01); *G06F 11/2033* (2013.01)

(58) Field of Classification Search
CPC ................................ G06F 1/12; G06F 11/2033
See application file for complete search history.

(56) References Cited

U.S. PATENT DOCUMENTS

| | | | |
|---|---|---|---|
| 7,440,511 B2 | 10/2008 | Staszewski et al. | |
| 2004/0096016 A1* | 5/2004 | Choudhury | H04L 7/0338 375/340 |
| 2004/0264611 A1* | 12/2004 | Pereira | 375/354 |
| 2004/0264613 A1* | 12/2004 | Buchmann | H04L 7/0337 375/354 |
| 2006/0227911 A1* | 10/2006 | Millman et al. | 375/348 |
| 2008/0065820 A1* | 3/2008 | Gillingham | G06F 13/1689 711/105 |
| 2013/0101075 A1* | 4/2013 | Helmschmidt | H04L 7/042 375/355 |

FOREIGN PATENT DOCUMENTS

| | | |
|---|---|---|
| JP | 2008047975 | 2/2008 |
| WO | 2010039108 A1 | 4/2010 |

* cited by examiner

*Primary Examiner* — Syed Haider
(74) *Attorney, Agent, or Firm* — DeLio, Peterson & Curcio LLC; Kelly M. Nowak

(57) ABSTRACT

Embodiments of the present invention disclose an apparatus and method for recovering a data signal in a digital transmission. A computer processor receives a data signal from a data signal input wire. The computer processor receives an external clock signal. The computer processor samples a binary bit of the data signal multiple times per clock cycle. The computer processor determines, for each sampling group, a sample and a quality measurement. The computer processor stores, for each sampling group, the sample and the quality measurement into a set of memory elements. The computer processor stores the sample from each sampling group into a first and a second delay chain. The computer processor determines a current sampling point. The computer processor transmits output corresponding to a content of the current sampling point to a data signal output wire.

10 Claims, 9 Drawing Sheets

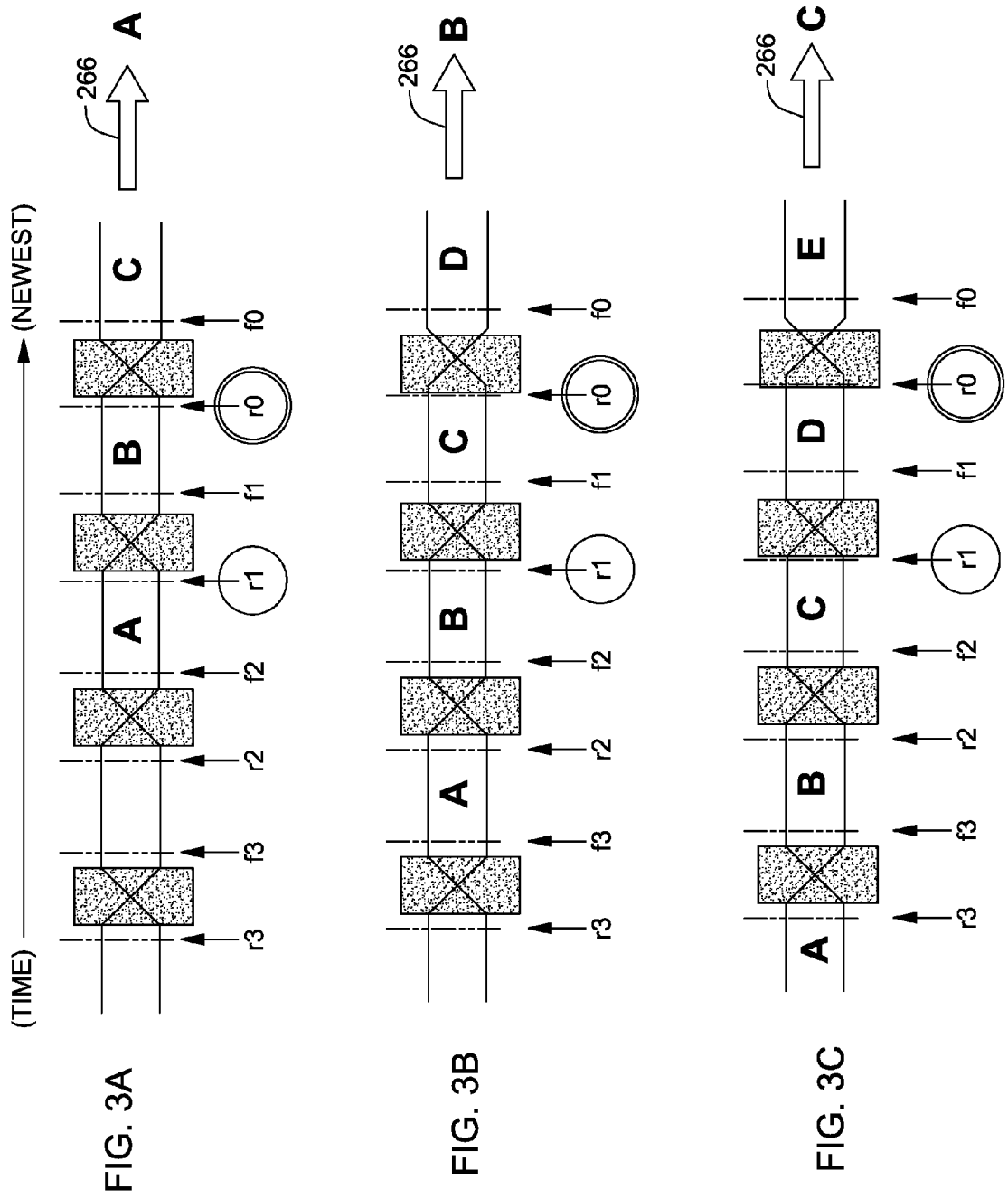

FSM LOGIC:

SWITCH SEQUENCE:

410 — IF ( state = r1_alternate_is_f1 AND r0_quality is bad )
412 — THEN next_state := f1
414 — ELSE IF ( state = r1_alternate_is_f2 AND r0_quality is bad )
416 — THEN next_state := f2_alternate_is_r1

LEARNING SEQUENCE:

418 — ELSE IF ( (state = r1_alternate_is_f1)
420 — OR (state = r1_alternate_is_f2) )
  THEN
422 —  IF  (r0 concat r1 concat r2) = (f0 concat f1 concat f2)
424 —  AND (r0 concat r1 concat r2) /= (f1 concat f2 concat f3)
426 —  THEN next_state := r1_alternate_is_f1
428 —  ELSE IF (r0 concat r1 concat r2) = (f0 concat f1 concat f2)
430 —  AND (r0 concat r1 concat r2) /= (f1 concat f2 concat f3)
432 —  THEN next_state := r1_alternate_is_f2
434 —  ELSE next_state := current_state
436 — 
438 — ELSE next_state := current_state
440 — END IF

FIG. 4

APPARATUS AND METHOD TO RECOVER A DATA SIGNAL

FIELD OF THE INVENTION

The present invention relates generally to the field of digital data transmission, and more particularly to an apparatus and method for determining when to switch to an alternate sampling point within a digital signal, and learning the best alternate sampling point.

BACKGROUND OF THE INVENTION

Transmission speeds of digital data are constantly being pushed to the next limit. Everybody wants their computer or smartphone to run faster, or wants to download larger data files quicker than ever before. Recognizing that speed is not the only concern, it is equally important that the received data actually matches what was sent. All data gets broken down and converted back to simple 0's and 1's. Each byte that is sent through digital communication, no matter how physically far it may travel, must be readable without error and without loss at the receiving end.

A clock signal is produced by a clock generator, comprising a resonant circuit and an amplifier. The clock signal oscillates between a high and low state, usually at a fixed frequency. There are many clocks inside of microprocessors used for many different functions. The reading of a digital data transmission is triggered by either the rising edge, or falling edge of a clock signal.

In synchronous data transmission, no start or stop bit is typically used, but rather transmission speeds are synchronized at both the sending and receiving end using clock signals. While the data transfer is quicker without using stop and start bits, eventually the clocks will get out of sync and some bytes will become corrupted. The data and clock signals can get delayed differently due to environmental factors, such as temperature drift or maximum phase jitter. Jitter is a deviation from the true periodicity of an oscillating signal in frequency, amplitude or phase. Jitter may be created by electromagnetic interference and crosstalk with carriers of other signals. Jitter may be reduced through the use of filters and buffers, but can still be a problem. Current solutions for clock delays require frequent re-synchronization of the clocks, the use of a check or parity bit, or the use of a much slower data speed compared to the clock speed during digital transmissions.

SUMMARY

Embodiments of the present invention disclose an apparatus and method for recovering a data signal in a digital transmission. A computer processor receives a data signal from a data signal input wire. The computer processor receives an external clock signal, wherein the external clock signal differs from an internal clock signal with an unknown phase offset. The computer processor samples a binary bit of the data signal multiple times per clock cycle forming at least a first and a second sampling group, wherein each sampling group includes more than one sample of the binary bit stored into more than one memory element. The computer processor determines, for each sampling group, a sample and a quality measurement, wherein the sample is the stored sample from one of the more than one memory elements of each sampling group. The computer processor stores, for each sampling group, the sample and the quality measurement into a set of memory elements. The computer processor stores the sample from each of at least the first and the second sampling group into at least a first and a second delay chain respectively, wherein each delay chain includes at least three additional memory elements connected in series. The computer processor determines a current sampling point, wherein a sampling point is one of the at least three additional memory elements in one of at least the first and the second delay chain. The computer processor determines an alternate sampling point, wherein the alternate sampling point is one of the at least three additional memory elements in one of at least the first and the second delay chain which samples the same binary bit in the data signal as the current sampling point. The computer processor transmits output corresponding to a content of the current sampling point to a data signal output wire.

BRIEF DESCRIPTION OF THE SEVERAL VIEWS OF THE DRAWINGS

FIGS. 3A to 3E are exemplary timing diagrams depicting a digital data signal illustrating a transition, and the switching to an alternate sampling point, in accordance with an embodiment of the present invention.

FIG. 4 shows a pseudo-code representation of the logic performed by the FSM of FIG. 2B, in accordance with an embodiment of the present invention.

DETAILED DESCRIPTION

Figure 1:
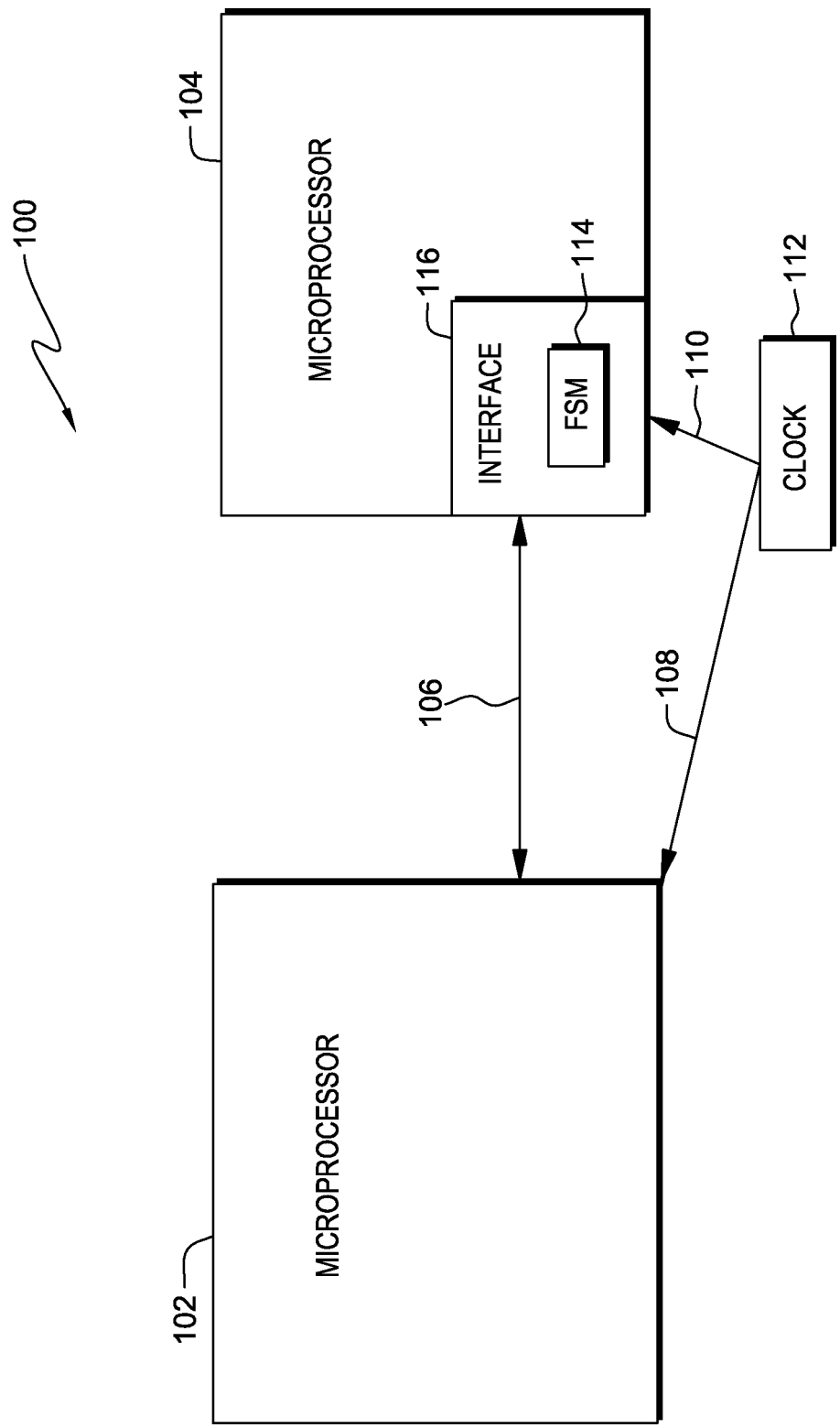
FIG. 1 is a block diagram illustrating a data processing environment, generally designated 100, in accordance with one embodiment of the present invention.

A latch is a circuit which has two stable states and is used to store state information. A latch is used to store one bit of data, typically a 0 or 1. A latch can be used in a finite state machine as a data storage element, in which case it is called a sequential logic circuit. The circuit can be made to change state by applying signals to one or more control inputs which will have one or two outputs. When used in a finite state machine (FSM), the output and next state of a latch depend on both the current input and the current state. An FSM may be used to model communication protocol design by listing all possible states and defining the triggering condition for transition from one state to another.

As data transmissions become faster and faster, creating communication protocols to receive good quality data at improved speeds can provide a competitive edge over the competition. Embodiments of the present invention recognize that when sampling a digital signal which is no longer synchronous with the clock, due to delays from data traveling time or temperature drift, there is a danger that a sampling point may line up between bits giving a poor quality sample, or missing a bit entirely. An embodiment of the present invention defines an apparatus capable of storing two groups of sampling a data signal multiple times per clock cycle, establishing a quality measure of each sampling group, and forwarding the middle sample from each sampling group. The two groups are sampled at different phases of the clock, such that at least one of the sampling groups will not be read at a transition point between bits. With each clock cycle, the middle samples of both groups are further delayed by a series of hardware latches, such that for each currently selected sample point, an alternate sample is stored from the current and previous clock cycle. A default sample point is initially selected, and with each clock cycle, the apparatus learns which alternate sample is best, so when the current bit sample becomes poor quality, the bit sample from the best alternate is selected next. In this way, each bit of the digital signal is serially received without losing a bit due to a poor quality sampling point. Instead of delaying the clock, the data is delayed and held in the latches until a proper selection can be made, allowing for a medium bandwidth for digital transmissions.

As will be appreciated by one skilled in the art, aspects of the present invention may be embodied as a method or system. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

As used herein, "logic" such as control logic, is a sequence of steps required to perform a specific function, and, in the embodiment, is implemented through hardwired computer circuits and other hardware or, alternatively, firmware, such as low-level program instructions stored on a read only memory (ROM) and executed by one or more control circuits.

As used herein, a "computer processor," or "microprocessor," can be a semiconductor chip that resides in computers, smart phones, and other electronic devices. A microprocessor can contain integrated circuits and other sequential digital logic components. The basic job of the computer processor is to receive input and provide the appropriate output by interpreting and executing commands from the computer's hardware and software.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It may be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. Thus, the present invention is not limited to the embodiments shown, but is to be accorded the widest scope consistent with the principles and features disclosed herein.

Implementation of embodiments of the invention may take a variety of forms, and exemplary implementation details are discussed subsequently with reference to the Figures. The embodiment illustrated in the Figures describes an apparatus to recover digital signal transmissions. Specific details disclosed herein are not to be interpreted as limiting, but merely as a representative basis for teaching one skilled in the art to variously employ the methods and structures of the present disclosure.

The present invention will now be described in detail with reference to the Figures. FIG. 1 is a block diagram illustrating a data processing environment, generally designated 100, in accordance with one embodiment of the present invention. In one embodiment, data processing environment 100 includes a first integrated circuit microprocessor, microprocessor 102, and a second integrated circuit microprocessor, microprocessor 104, which are connected via serial data line 106, as well as clock 112 which connects both to microprocessor 102 via serial clock line 108, and to microprocessor 104 via serial clock line 110.

Microprocessor 102 and 104 can each respectively be a general purpose microprocessor, a specialized microprocessor, a service processor, an embedded controller or microcontroller, a central processing unit (CPU), a multi-core processor, a Digital Signal Processor (DSP), a Graphics Processing Unit (GPU), a co-processor, a Reduced Instruction Set Computer (RISC) microprocessor, a Complex Instruction Set Computer (CISC) microprocessor, or any electronic device which accepts digital data as input, and is capable of communicating with another microprocessor via serial data line 106. Microprocessor 102 and 104 may be physically located together on a single test fixture, on a single chip carrier package, on a single printed circuit board, within the same computer, or in separate computers with variation in the length and make-up of serial data line 106, and serial clock line 108, and 110.

In one embodiment of the present invention, clock 112 is an external clock transmitting a clock signal to both microprocessor 102 and 104, via clock signal line 108 and 110 respectively. Both microprocessor 102 and 104 have several internal clocks for various purposes, which are not shown. A clock signal in a microprocessor is a signal which oscillates between a high and low state, and is used to coordinate actions of circuits within the microprocessor. In the embodiment, the internal clock signal is in the form of a square wave with a 50% duty cycle, and a fixed, constant frequency. In the embodiment, circuits using the clock signal become active at either the rising edge, or falling edge of the clock signal waveform. An inverted clock is 180 degrees out of phase with the regular internal clock, such that the rising edge becomes a falling edge. In the embodiment, microprocessor 104 uses both a regular and an inverted capture clock for timing data sampling of a received data signal transmission. The embodiment uses a clock frequency of 166 MHz, but the invention is not limited to a specific clock frequency.

In the embodiment, serial data line 106 provides a digital signal pathway for transmission of data between microprocessor 102 and microprocessor 104. Serial clock line 108 provides a digital signal pathway for transmission of a clock signal from clock 112 to microprocessor 102. Serial clock line 110 provides a digital signal pathway for transmission of a clock signal from clock 112 to microprocessor 104. The digital signal pathway of serial clock line 108 and 110, and serial data line 106, each respectively comprises one or more of the following: a resistor, a transistor, a capacitor, an inductor, a diode, a conductive wire, a solder ball, or a solder connection. One skilled in the art will recognize that there are other methods to provide a digital signal pathway. Embodiments of the present invention may apply to digital signal transmissions including, but not limited to, integrated chip to integrated chip transmissions, central processor to service processor transmissions, computer to computer transmissions, and serial transmissions over a single wire, or multiple wires.

In an alternate embodiment, multiple serial data lines may exist, such as on a data bus, where each individual line is treated the same as the single data line in the illustrative embodiment. In the alternate embodiment, the transitions and switching related to one line may be used to control all of the lines provided all the lines have the same delay in the transmission. A synchronizing unit may be needed to synchronize the multiple samples to the capture clock, such that for each clock cycle multiple samples together with their quality measure are available. A pipeline unit delays the data, such that the samples of multiple cycles are available for selection.

In one embodiment of the present invention, clock 112 transmits a clock signal to microprocessor 102 via serial clock line 108, and to microprocessor 104 via serial clock line 110. Microprocessor 102 transmits a data signal to microprocessor 104 via serial data line 106, and microprocessor 104 may transmit a data signal to microprocessor 102 via serial data line 106. Clock signals and data signals can both be delayed during transmission from sender to receiver due to effects including, but not limited to, temperature drift, data traveling time, noise, cross-talk and phase jitter. In the transmission of the clock signal from clock 112 to microprocessor 102, the clock signal is delayed by a first measure of time, such as delta 118. In the transmission of the clock signal from clock 112 to microprocessor 104, the clock signal is delayed by a second measure of time, such as delta 120. In the case where clock 112 is physically closer to microprocessor 104 than to microprocessor 102, as pictured in FIG. 1, delta 120 is less than delta 118 due to less traveling time. A signal from microprocessor 102 to microprocessor 104 is delayed by a third measure of time, such as delta 122. As a result, the relationship between the data signal received via serial data line 106 and the clock signal received via serial clock line 110 is an unknown. Sampling the received data signal using either the received clock signal or an internal clock signal derived from the clock signal received via serial clock line 110, both of which have the same frequency but have an unknown phase offset with the received data signal increases the likelihood of sampling the data signal at transition points between bits yielding poor quality data and possible dropped bits.

In the embodiment of the present invention, the digital data signal comprises a serial transmission of one bit after another. A data signal is a waveform which oscillates between a high and low voltage state, such as 0 V and 1 V, and is used to represent binary data, i.e., 0 or 1. In between transmitted binary bits, there may be a transition point where the data is changing from one bit to the next bit. At the transition point, the voltage level may not be 0 or 1, but something in-between. If a digital signal is sampled during the transition point, the resulting output may not correspond to the original input as the in-between reading may arbitrarily be mapped to a 0 or 1. The apparatus of the embodiment of the present invention is capable of detecting the transition point, and is further described in FIG. 2A. The data signal transmission has a protocol layer that determines when there is an upcoming gap in the data signal to allow the apparatus to reset as needed.

Interface 116 is physically integrated into microprocessor 104 comprising conductive wires, latches, flip flops, at least one input line for serial clock line 110, at least one input and output line for serial data line 106, FSM 114, a multiplexer, and at least one output line, output 266, for transmitting the recovered data from a data signal.

FSM 114 is a finite state machine physically integrated into microprocessor 104 comprising internal memory circuits and sequential digital logic including, but not limited to logic gates, latches, flip flops, conductive wires or a programmable logic controller. A finite state machine depends on both current input and previous state to determine the next state or output. The apparatus of the embodiment of the present invention, through FSM 114, is capable of switching to an alternate sampling point when the current sample quality is bad, and learning which sampling point is currently the best alternate. FSM 114 is further described in FIG. 2B. The logic of FSM 114 is described further in FIG. 4, and an example of the selection of an alternate sampling point is described in FIG. 5.

Figure 2A:
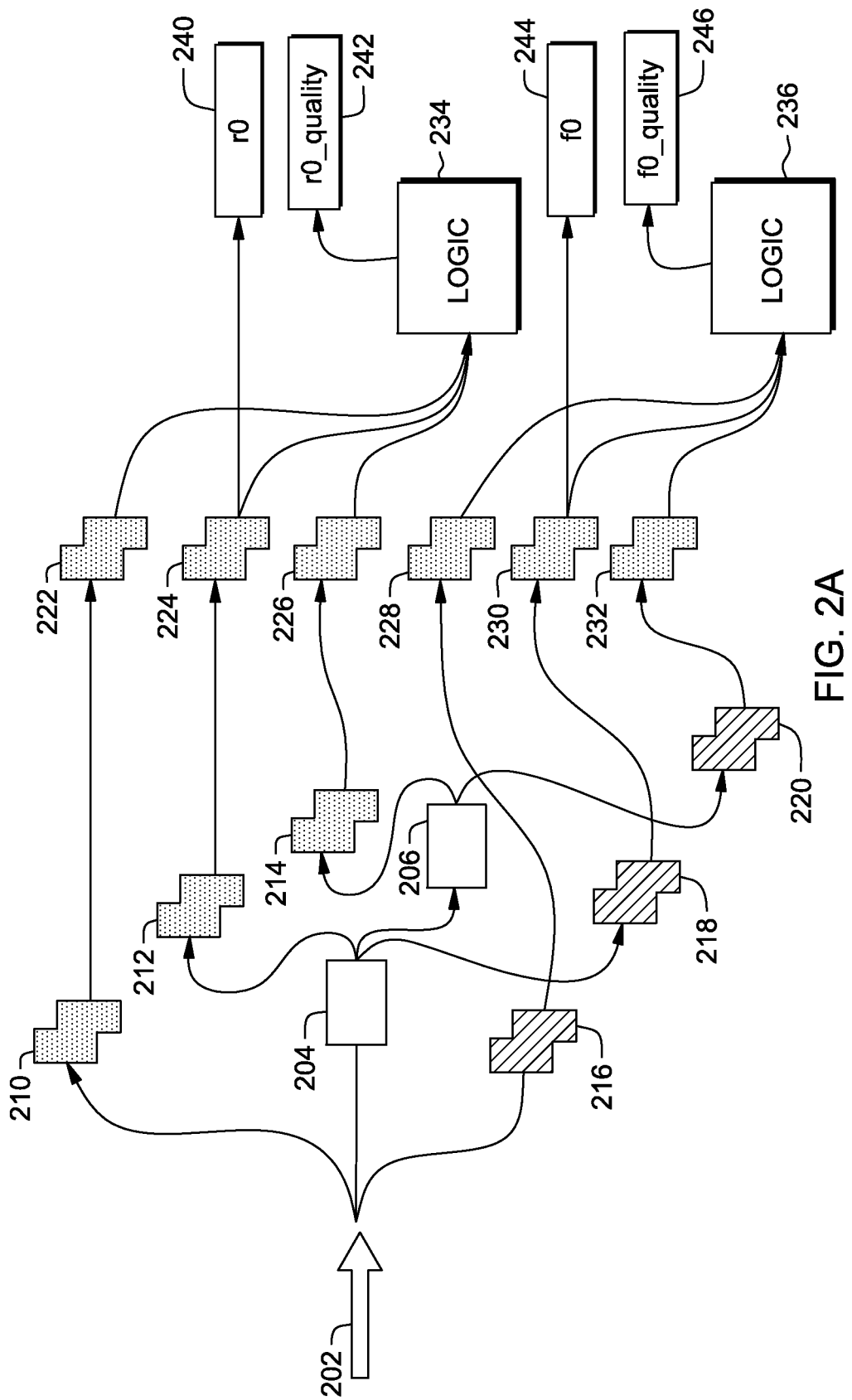
FIG. 2A is a block diagram of electronic components used to delay bit data for two sampling groups, to determine a quality measurement of the sampling groups, and to output one sample with a corresponding quality measurement for each group, in accordance with an embodiment of the present invention.

FIG. 2A is a block diagram of electronic components used to delay bit data for two sampling groups, to determine a quality measurement of the sampling groups, and to output one sample with a corresponding quality measurement for each group, in accordance with an embodiment of the present invention. The method involves storing sampling groups of a data signal sampled multiple times per clock cycle, establishing a quality measure of each sampling group, and selecting a good sampling point from each sampling group. In the illustrative example, two sampling groups are shown, but multiple sampling groups are possible with the inclusion of more latches and extended digital logic.

The apparatus of the embodiment of the present invention uses latches to store single bits of data until the next clock cycle. The latch, such as the D flip-flop latch, is a circuit which has two stable states and can be used to store state information. These latches are used in sequential logic circuits for finite state machines, such as FSM 114. A person of ordinary skill in the art will recognize there are other ways in which bit storage may be performed.

In the embodiment of the present invention, microprocessor 102 transmits a data signal, such as data signal 202, to microprocessor 104 via serial data line 106. Data signal 202 is routed through delay element 204 and 206 to delay the signal twice, wherein each delay is small compared to the capturing clock cycle. A first sampling group of three samples, one from data signal 202 directly, one after delay element 204, and one after delay element 206, are captured in latches 210, 212, and 214 with the rising edge of the internal capturing clock, and as such the samples are labeled with an "r" for rising. A second sampling group of three samples, one from data signal 202 directly, one after delay element 204, and one after delay element 206, are captured in latches 216, 218, and 220 with the rising edge of the inverted clock (the phase of the internal capturing clock shifted by 180 degrees). The rising edge of the inverted clock is the same as the falling edge of the regular clock, and as such the samples are labeled with an "f" for falling.

To get all samples for the two groups to align onto the same internal capturing clock, the bit content in the first latches, i.e., latches 210, 212, 214, 216, 218, and 220, are transmitted and latched a $2^{nd}$ time into latches 222, 224, 226, 228, 230, and 232, respectively. All of these latches are transmitted and captured using the regular clock signal of the internal capturing clock.

Latches 222, 224, and 226 are wired as inputs into logic circuit 234, and latches 228, 230, and 232 are wired as inputs into logic circuit 236. Logic circuit 234 performs a consistency check on the three bits of input from latches 222, 224, and 226, meaning the contents of latch 222 equal the contents of latch 224 equal the contents of latch 226. This logic is hardwired into the structure of microprocessor 104. Logic circuit 236 compares the three bits of input from latches 228, 230, and 232 in the same way. The output of logic circuit 234 is transmitted into latch 242 and is referred to as r0_quality. The output of logic circuit 236 is transmitted into latch 246 and is referred to as f0_quality.

In the embodiment of the present invention, sampling three times, with a small delay between samples, helps determine the stability of the data signal at the sampling point. For example, if all three samples of rising data are the same, i.e., latches 222, 224, and 226, then the data is stable and r0_quality is good. If the three samples are not the same, then the data was unstable during sampling, and cannot be used. The data becomes unstable when the sampling point is at the transition point between two bits of data in a digital transmission, and the quality measurement, r0_quality, will be bad. The quality measurement is represented by bit data, for example, good is 0, and bad is 1. In an alternate embodiment, good is 1 and bad is 0. The goal is to detect the transition or sampling instability point, so that an alternate sampling point with good quality can be selected.

The two delay chains output a measure of quality for each, r0_quality and f0_quality, and output a data bit for each, such as r0 and f0. Latch 240 holds r0, and latch 244 holds f0. The content of the middle latch of each delay chain is transmitted to the corresponding latch. For example, latch 224 transmits the bit content to latch 240 and the bit is now referred to as r0. Latch 230 transmits the bit content to latch 244 and the bit is now referred to as f0. In the illustrative embodiment, the middle latch of each sampling group is transmitted to latch 240 and 244, but any one of the delay chain latches of a group may be transmitted for the sampling group. If the quality measurement is good for the sampling group, then all the delay chain latches contain the same contents. If the quality measurement is bad, the sample will not be selected for use by FSM 114, and the contents are irrelevant.

Figure 2B:
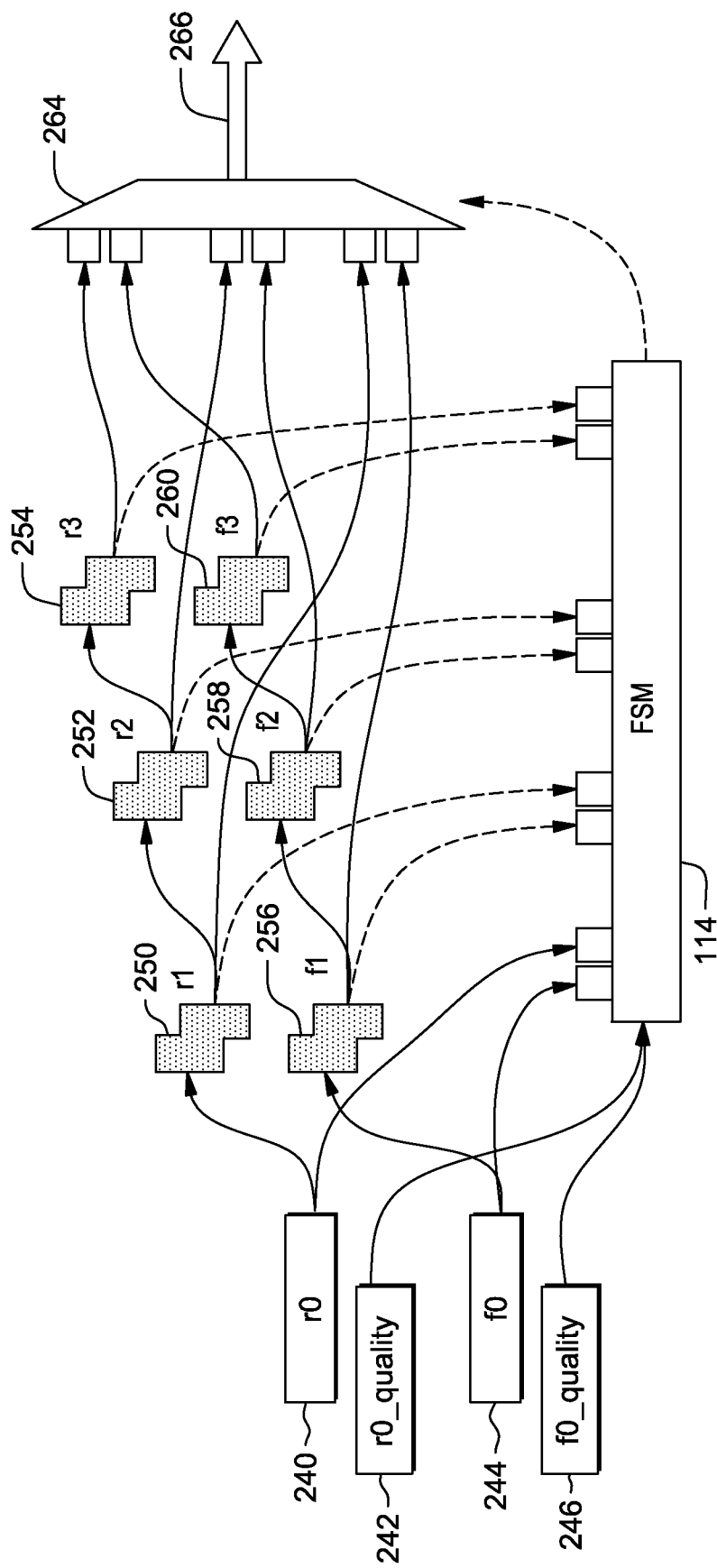
FIG. 2B is a block diagram of electronic components used to delay sampled bits, to determine when a transition happens, learn what a good alternate sampling point is, and switch to the alternate sampling point when the current sampling point becomes bad, in accordance with an embodiment of the present invention.

FIG. 2A continues to the right and is described further in FIG. 2B.

FIG. 2B is a block diagram of electronic components used to delay sampled bits, to determine when a transition happens, learn what a good alternate sampling point is, and switch to the alternate sampling point when the current sampling point becomes bad, in accordance with an embodiment of the present invention. FIG. 2B is a continuation of FIG. 2A moving left to right.

Upon each clock cycle, the contents of r0 (latch 240), f0 (latch 244), r0_quality (latch 242) and f0_quality (latch 246) are transmitted to inputs on FSM 114.

Upon each clock cycle, the contents of r0 (latch 240), and f0 (latch 244), representing the two sampling groups, are transmitted into the next latch, latch 250 and latch 256 respectively. The contents of latch 250 are referred to as r1, and the contents of latch 256 are referred to as f1. At the same time, the content which was in r1 (latch 250) is transmitted to latch 252, which is referred to as r2, and the content which was in f1 (latch 256) is transmitted to latch 258, which is referred to as f2. At the same time, the content which was in r2 (latch 252) is transmitted to latch 254, which is referred to as r3, and the content which was in f2 (latch 258) is transmitted to latch 260, which is referred to as f3. With each clock cycle, the data is moved along in the delay chain so that samples from the current and previous clock cycles are available for selection when a transition happens.

Upon each clock cycle, the bit contents of r1 (latch 250), r2 (latch 252), r3 (latch 254), f1 (latch 256), f2 (latch 258), and f3 (latch 260) are each transmitted into inputs of FSM 114 and also into inputs of multiplexer 264. A multiplexer is a device that selects from one of several input signals and forwards the selected input into a single line. Upon each clock cycle, FSM 114 uses the current input, the previous states found in the delay chain, and logic circuits to determine which bit is selected for transmission to output 266. FSM 114 transmits a signal to multiplexer 264 to open a specific gate within multiplexer 264 to transmit the selected bit to output 266. Output 266 represents the recovered data from the data signal received via serial data line 106. Output 266 is transmitted out of interface 116 to locations within microprocessor 104 for processing. The logic required to determine which bit is selected for transmission to output 266 is illustrated in FIG. 4. An illustration showing the detection of a transition point and the switching of the current sampling point to the alternate sampling point is further described in FIGS. 3A to 3E.

FIGS. 3A to 3E are exemplary timing diagrams depicting a digital data signal illustrating a transition, and the switching to an alternate sampling point, in accordance with an embodiment of the present invention.

FIG. 3A shows a timing diagram wherein the vertical dashed lines represent the edges of the capture clock signal lines, both rising edges and falling edges. The rising edges are labeled r3, r2, r1, and r0. The falling edges are labeled f3, f2, f1, and f0. The shaded boxes between each rising edge and falling edge of the clock cycle, such as between r3 and f3, shows where the transition point occurs between bits in the data signal transmission. Quality measurements are determined at r0 and f0 (the three samples and logic are not shown, but were discussed in FIG. 2A), such that if the vertical dashed line is inside the shaded box, the quality is bad. In FIG. 3A, the vertical dashed lines at r0 and f0 are both outside the shaded box, so r0_quality and f0_quality are both good. FIG. 3A shows a timing diagram that starts at a point in time when the state of FSM 114 indicates the current sampling point is r1, as shown by the circle surrounding r1 in FIG. 3A, with the alternate sampling point at f2. Sampling is at r1, and the bit represented by A in FIG. 3A is issued or transmitted to output 266. On the next clock cycles, the current sampling will remain at r1 as long as r0_quality is good for the sampling at r0, as shown by the double circle in FIG. 3A.

FIG. 3B shows the same timing diagram after a first additional clock cycle. The bit, represented by B in FIG. 3B, that was previously at r0 has now moved into r1, and the bit that was in r1 has moved into r2. This was discussed in FIG. 2B, when the content of r0 (latch 240) was transmitted into latch 250 (r1) on the next clock cycle. Each sample was transmitted to the next latch in the delay chain with each clock cycle. In FIG. 3B, the vertical dashed lines at r0 and f0 are both still outside the shaded box signifying r0_quality and f0_quality both remain good. The vertical dashed line at r0 is getting closer to the shaded box with each clock cycle. Sampling is at r1, and the bit represented by B in FIG. 3B is transmitted to output 266. On the next clock cycle, the current sampling point will remain at r1 because r0_quality is good.

FIG. 3C shows the same timing diagram after a second additional clock cycle. The vertical dashed line at r0 is inside the shaded box, r0_quality is bad, and a transition point has been detected. Sampling is still at r1 for this clock cycle because when the bit currently at r1 was at r0 in the previous clock cycle, the r0_quality measurement was good. The bit at r1 represented by C in FIG. 3C is transmitted to output 266. The vertical dashed line at f0 is outside the shaded box, meaning f0_quality is good, and therefore an alternate "f" sample will be selected for the next sampling point. On the next clock cycle, the sampling point will switch to f2 based on logic from FSM 114. The logic of switching to f2 instead of f1 is detailed further in FIG. 5.

Figure 3D:
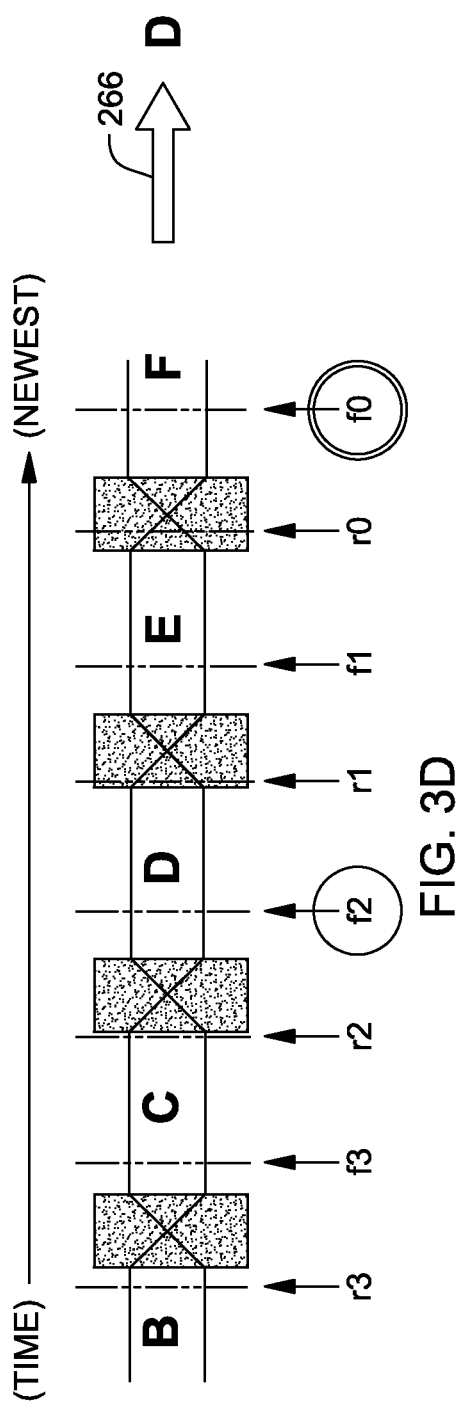

FIG. 3D shows the same timing diagram after a third additional clock cycle. The vertical dashed lines at r0 continue to be in the shaded box, indicating r0_quality is bad. The vertical dashed lines at f0 continue to be outside the shaded box, such that f0_quality is good. Current sampling is now at f2, and the bit represented by D in FIG. 3D is transmitted to output 266. On the next clock cycles, the current sampling will remain at f2 as long as f0_quality is good for the sampling at f0, as shown by the double circle in FIG. 3D.

Figure 3E:
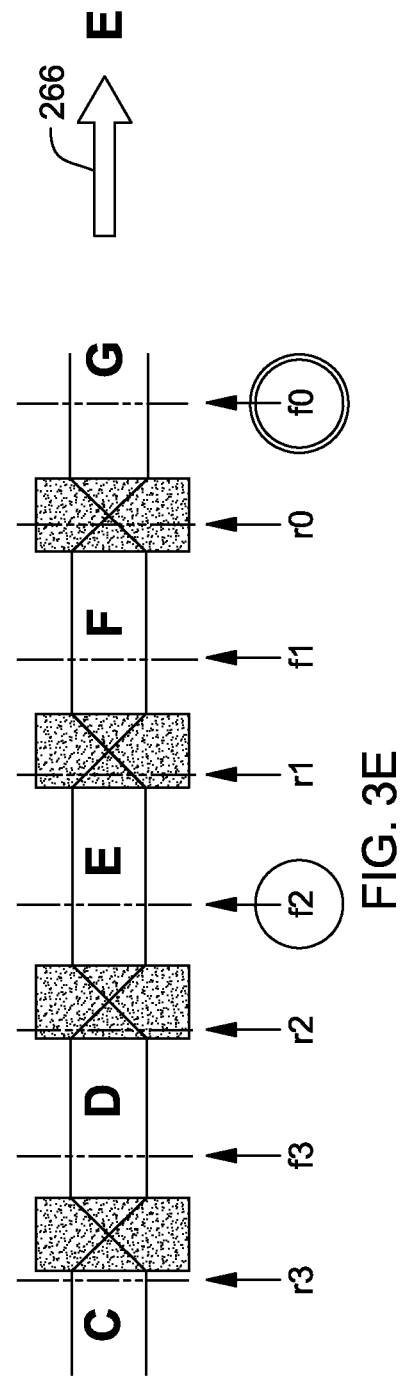

FIG. 3E shows the same timing diagram after a fourth additional clock cycle. The vertical dashed lines at f0 continue to be outside the shaded box, such that f0_quality is good. Sampling is at f2, and the bit represented by E in FIG. 3E is transmitted to output 266. Current sampling will remain at f2 as long as f0_quality remains good.

FIG. 4 shows a pseudo-code representation of the logic performed by the FSM of FIG. 2B, in accordance with an embodiment of the present invention. FSM 114 does not actually run this code, but the logic is physically integrated into microprocessor 104 through internal memory circuits and sequential digital logic which comprise a finite state machine. The pseudo-code shown in FIG. 4 does not comprise all the logic of FSM 114, but rather a sub-set of the pseudo-code for illustrative purposes only.

In the embodiment of the present invention, FSM 114 performs at least two primary functions: switching to an alternate sampling point when the current sample quality is bad, and learning which sampling point is currently the best alternate. Code lines 410 through 416 represent the switching sequence, and code lines 418 through 440 represent the learning sequence.

The switching sequence determines when to switch the current sampling point to the alternate sampling point. Whenever a transition between bits is detected, the quality measurement is bad, and the current sampling point is switched to the alternate sampling point on the next clock cycle. The current state of FSM 114 which comprises the current sampling point, and the alternate sampling point can be indicated by a variable such as, "r1_alternate_is_f1". The illustrative example of FIG. 4 starts with current sampling at point r1. Lines 410 and 412 determine when current sampling is at r1 and the alternate is f1, whenever r0_quality changes from good to bad, the current sampling on the next clock cycle switches to f1. Lines 414 and 416 determine when current sampling is at r1 and the alternate is f2, whenever r0_quality changes from good to bad, the current sampling on the next clock cycle switches to f2.

The learning sequence determines the alternate sampling point. Determining the correct alternate sampling point prevents dropping bits from the received data signal. In the example of lines 418 through 440, the current sampling starts at r1, and the alternate sampling is either f1 or f2. FSM 114 performs lines 424 through 434 to compare a group of three "r" (rising edge) values to two groups of three "f" (falling edge) values, and determine an alternate sampling point. Whenever one group of three "f" values matches the group of three "r" values, the alternate sampling point is set to the middle "f" value. This middle value corresponds to the same bit being sampled by r1, so that no bits are dropped during recovery of the data signal. See FIG. 5 for an illustration of this comparison and selection of the alternate sampling point. In line 436, if neither group of three "f" values or both groups of three "f" values matches the group of three "r" values, then the alternate sampling stays the same. In line 438, if sampling is not at r1 with alternate at f1 or f2, then the alternate sampling stays the same. Line 444 ends the pseudo-code by closing the IF-THEN statement.

There would be a similar set of pseudo-code for the case of sampling at f2 with alternates of r1 and r2, which is not shown. In the case of sampling at either f1 or f2, learning does not happen, and switching does not happen until a reset of FSM 114 to another state can occur. The logic of the switching and learning is further described in FIG. 6.

Figure 5:
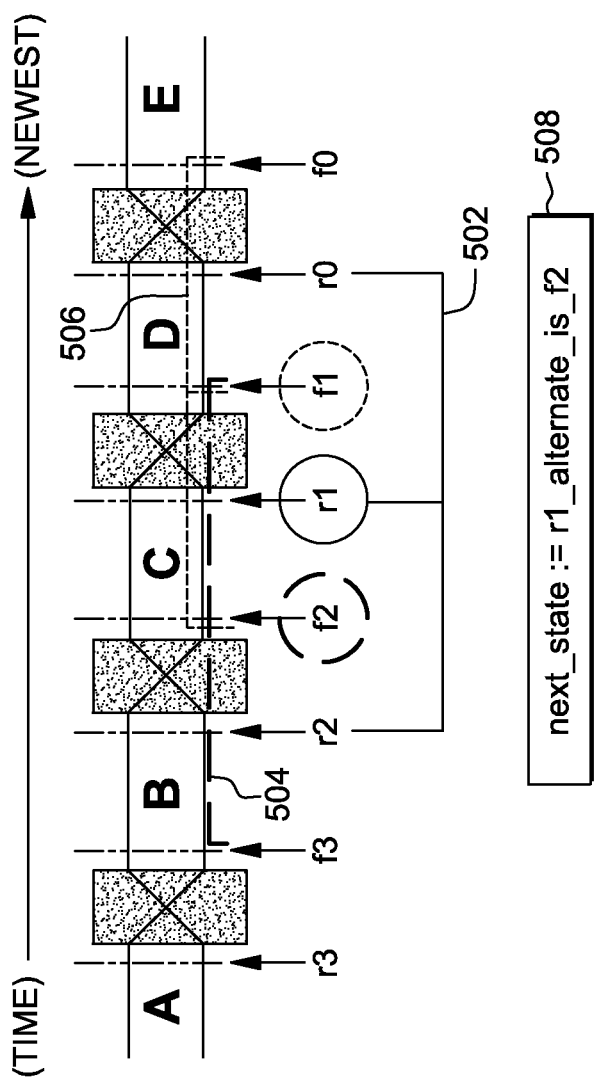
FIG. 5 shows a timing diagram representing an example of the learning sequence from the pseudo-code of FIG. 4, in accordance with an embodiment of the present invention.

FIG. 5 shows a timing diagram representing an example of the learning sequence from the pseudo-code of FIG. 4, in accordance with an embodiment of the present invention.

In the timing diagram of FIG. 5, the current sampling point is r1, as indicated by the solid circle around r1. Comparisons of group 502, 504, and 506 are performed to determine the alternate sampling point. Group 502 comprises the values of sampling points r2, r1, and r0. Group 504 comprises the values of sampling points f3, f2, and f1. Group 506 comprises the values of sampling points f2, f1, and f0. The middle value of each groups are circled. From the timing diagram, the output values of group 502 are {B, C, D}, the output values of group 504 are {B, C, D}, and the output values of group 506 are {C, D, E}. Group 502 matches group 504, and does not match group 506. Since group 504 matches, the middle value of f2, is the next alternate sampling point. This example would make lines 430 and 432 true in the pseudo-code of FIG. 4, and line 434 would determine the next alternate sampling point is f2. f2 corresponds to the same bit being sampled by r1, shown as "C" in FIG. 5, so that no bits are dropped during recovery of the data signal. The result of the learning sequence, as shown in result 508, indicates the next state of FSM 114 is "r1_alternate_is_f2".

In the embodiment of the present invention, the learning step utilizes sampling points plus one and one-half clock cycles and minus one and one-half clock cycles, both earlier and later, than the current sampling point. In the example the current sampling point is r1, and the learning sequence uses samples up to one and one-half clock cycles away, such as f3 and f0. If the current sampling point were f2, the learning sequence would use samples from r3 to r0. If the current sampling point were r2 or f1, there would not be enough stored samples to use in a learning sequence. When the current sampling point is r2 or f1, the alternate sample does not exist and sampling remains at r2 or f1 until the finite state machine can be reset to the middle of the delay chain again.

Figure 6:
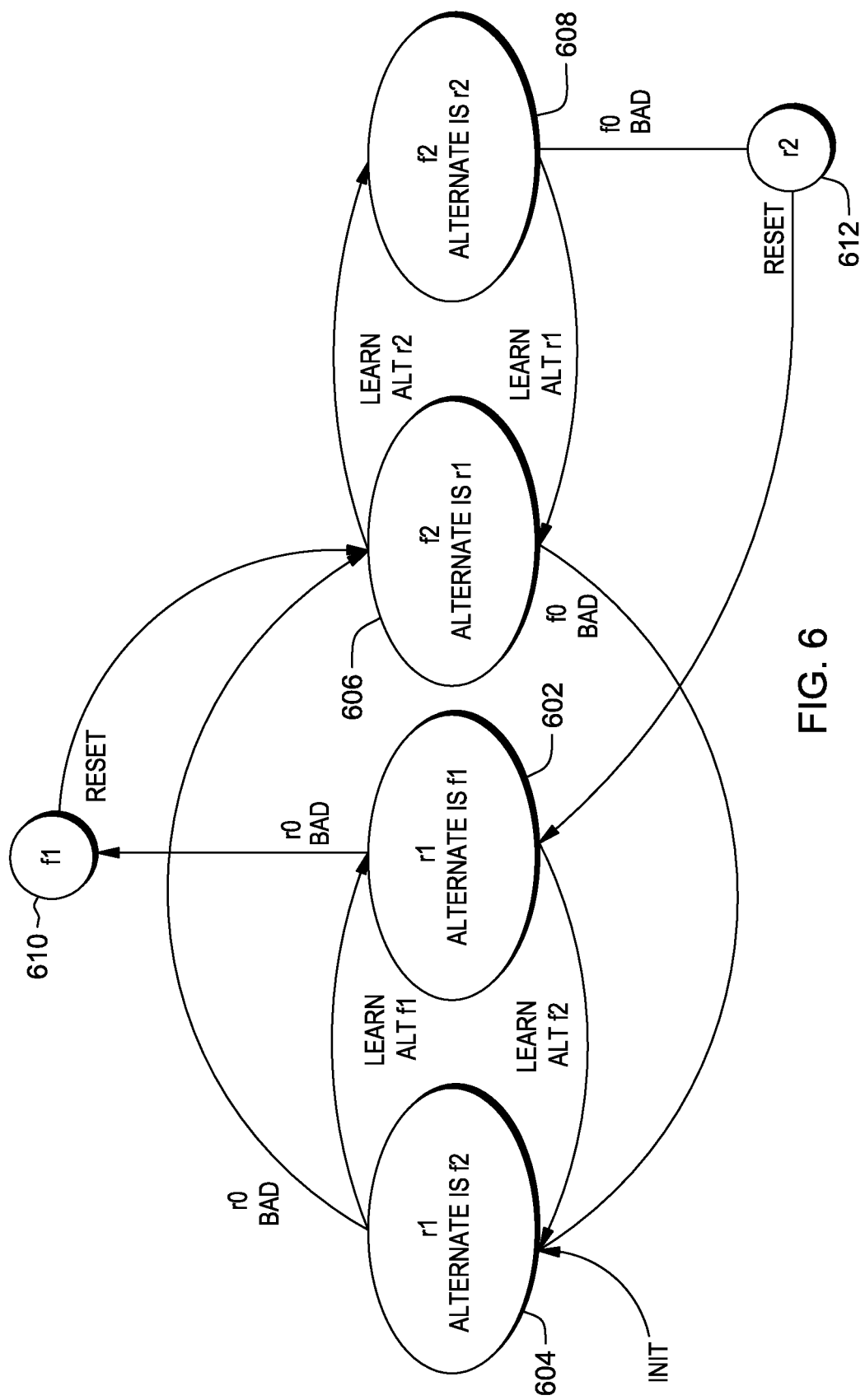
FIG. 6 shows a state transition diagram representing the possible states of the FSM of FIG. 2B, in accordance with an embodiment of the present invention.

FIG. 6 shows a state transition diagram representing the possible states of the FSM of FIG. 2B, in accordance with an embodiment of the present invention. Arrows going back to the same state are not shown to reduce clutter. It is assumed that when a condition on a transition arrow is not true, the state is not changing.

In the embodiment of the present invention, when microprocessor 104 is powered on, FSM 114 is initialized to "r1 ALTERNATE IS f2", as shown in state 604. The choice of state 604 for initialization is arbitrary, and may instead be any one of states 602, 606, and 608. States 602 and 608 are less preferred as they may switch to f1 or r2 early on in the transmission.

When the data signal starts, if r0_quality is good, then on the next clock cycle, the reading at r1 is transmitted to output 266. The current sampling point stays at r1 as long as r0_quality remains good. With each clock cycle, FSM 114 uses code 418 through 438 from FIG. 4 to learn which alternate is currently valid, i.e., "r1 ALTERNATE IS f1" OR "r1 ALTERNATE IS f2", as shown in the arrows between state 602 and 604. If the current state is "r1 ALTERNATE IS f2", and r0_quality is bad, then the reading at r1 is transmitted to output 266, and on the next clock cycle, the state of FSM 114 becomes "f2 ALTERNATE IS r1", as shown with an arrow pointing from state 604 to state 606. The current sampling point stays at f2 as long as f0_quality remains good. With each clock cycle, FSM 114 uses code similar to 418 through 438 from FIG. 4 to learn which alternate is currently valid, i.e., "f2 ALTERNATE IS r1" OR "f2 ALTERNATE IS r2", as shown in the arrows between state 606 and 608. If the current state is "f2 ALTERNATE IS r1", and f0_quality is bad, then the reading at f2 is transmitted to output 266, and on the next clock cycle, the state of FSM 114 becomes "r1 ALTERNATE IS f2", as shown with an arrow pointing from state 606 to state 604.

If the current state is "r1 ALTERNATE IS f1", and r0_quality is bad, then the reading at r1 is transmitted to output 266, and on the next clock cycle, the state of FSM 114 becomes "f1", as shown with an arrow pointing from state 602 to state 610. In this case, sampling will remain at f1 until there is a gap in the data signal which allows FSM 114 to reset the current state to "f2 ALTERNATE IS r1", as shown with an arrow pointing from state 610 to state 606.

If the current state is "f2 ALTERNATE IS r2", and f0_quality is bad, then the reading at f2 is transmitted to output 266, and on the next clock cycle, the state of FSM 114 becomes "r2", as shown with an arrow pointing from state 608 to state 612. In this case, sampling will remain at r2 until there is a gap in the data signal which allows FSM 114 to reset the current state to "r1 ALTERNATE IS f1", as shown with an arrow pointing from state 612 to state 602.

In the instance where the state of FSM 114 is either f1 or r2 at state 610 and 612, the current sampling point will not switch even if the quality measurement is bad. The protocol layer of the signal transmission will alert FSM 114 when an upcoming gap in the transmission is available to allow time to reset the state of FSM 114. Allowing the current sampling point to be earlier in the delay chain than f1, does not allow FSM 114 time to react to a poor quality measurement. Allowing the current sampling point to be at r2 or later in the delay chain than r2, does not allow FSM 114 enough latches to perform the learning step to determine an alternate sampling point.

In the embodiment of the present invention, the state of FSM 114 may move within the group of state 602, 604, 606, and 608 as many times as needed within a transmission, but will stay at state 610 or 612 until a gap in the transmission allows a reset. In an alternate embodiment, the state of FSM 114 may be set to only allow a set number of one or more moves between the different states depending on the needs of the microprocessor, and the average length of data signal transmissions.

In an alternate embodiment, using a longer delay chain, a larger version of FSM 114, and a larger version of multiplexer 264 may allow the apparatus more sampling point options with additional learning of alternates available. With a longer delay chain, FSM 114 may require fewer or no resets within a data signal transmission. The length of the delay chain is dependent on the amount of phase offset or shift of the data signal from the clock signal for which the apparatus must be capable of compensating. The illustrated embodiment presented using only three latches per delay chain, such as latch 250, 252, and 254 in FIG. 2B, is compensating for a small phase offset or shift. This should not be limiting to the invention which may be sized larger to compensate for a larger phase shift.

In a second alternate embodiment, using a second delay chain, a second multiplexer, and an extended version of FSM 114, may allow the apparatus to compensate for a small difference in frequency between the sending clock and the independent internal clock of the receiver. Embodiments discussed above deal with a fixed, constant frequency of the two clocks, but with an unknown phase offset relative to each other. In the alternate embodiment, the difference in frequency makes the received data signal appear to have a phase offset constantly drifting from the internal clock signal. This constant drift creates the need to constantly learn, as switching from current sampling point to alternate sampling point is expected to happen as part of the normal operation. For example, if the largest digital signal transmitted is 100 cycles long, the sending clock frequency is off by +1%, and the receiving clock frequency is off by −1%, then the signal would drift two cycles (a cycle for each percentage difference) during the 100 cycle long transmission causing the sampling point to switch four times.

The length of the second delay chain is related to the length of the longest allowable continuous transmission, and the amount of frequency shift of the data signal from the clock signal. A small difference of frequency may occur due to the accuracy of the sending and receiving clocks. For long transmissions, some transmissions of operations could be broken into sub-operations. A calculation of the number of latches in each delay chain, i.e., (num_latches), would be dependent on the rate by which the phase shifts per cycle in cycles, i.e., (shift_rate=(|(frequency_sender_clock_min−frequency_receiver_clock_max)|/frequency_receiver_clock), and on the maximum length of a continuous transmission in cycles of one bit per cycle, i.e., (max_length):

$$\text{num\_latches} = 3 + 2 * \text{shift\_rate} * \text{max\_length}$$

For example, if the shift rate is 2%, and maximum length is 100 cycles, the number of latches in each delay chain would be 7. The three relates to the number of latches required for the learning sequence, such that the first delay chain requires at least three initial latches beyond r0 and f0.

The part of the apparatus in FIG. 2A would not change. The set of four latches containing r0, r0_quality, f0, and f0_quality would be duplicated into a second delay chain with length from zero to the number of latches, num_latches. A second multiplexer connects to every set of latches in the second delay chain as input, and also receives a counter as input. The counter is stored in a memory element and receives input to increment or decrement from extended FSM 114. The counter represents the location in the second delay chain currently selected, and has limits of 0 to (num_latches−3). The counter may start at (num_latches−3)/2 on initialization or power-on. The second multiplexer outputs a subset of the second delay chain, based on the counter, which looks like the first delay chain of FIG. 2B, i.e., r0, f0, r1, f1, r2, f2, r3, and f3. Extended FSM 114 and multiplexer 264 receive the first delay chain as input. The second multiplexer also transmits to inputs of extended FSM 114 the quality measurements of r0 and f0. Extended FSM 114 includes additional output for either increasing or decreasing the counter used to point to the sub-set of the second delay chain currently in use. The counter increases or decreases by one, shifting the sub-set of latches and set of quality measurements input into extended FSM 114 by one clock cycle at a time to older (counter increases) or newer (counter decreases) values. From here, the switching and learning sequences operate in a similar manner as in FIGS. 4 and 5.

Constant learning requires guaranted transitions since a long string of 0's or 1's would suspend the learning sequence and may continue an outdated or invalid alternate sampling point. To prevent this, the protocol layer guarantees a minimum transition rate transmitting extra bits within the data signal transmission to force transitions, for example using 8b/10b encoding. With guaranteed transitions, the proper length of the second delay chain, and observed maximum transmission length, a valid alternate sampling point exists within the first delay chain.

Figure 7:
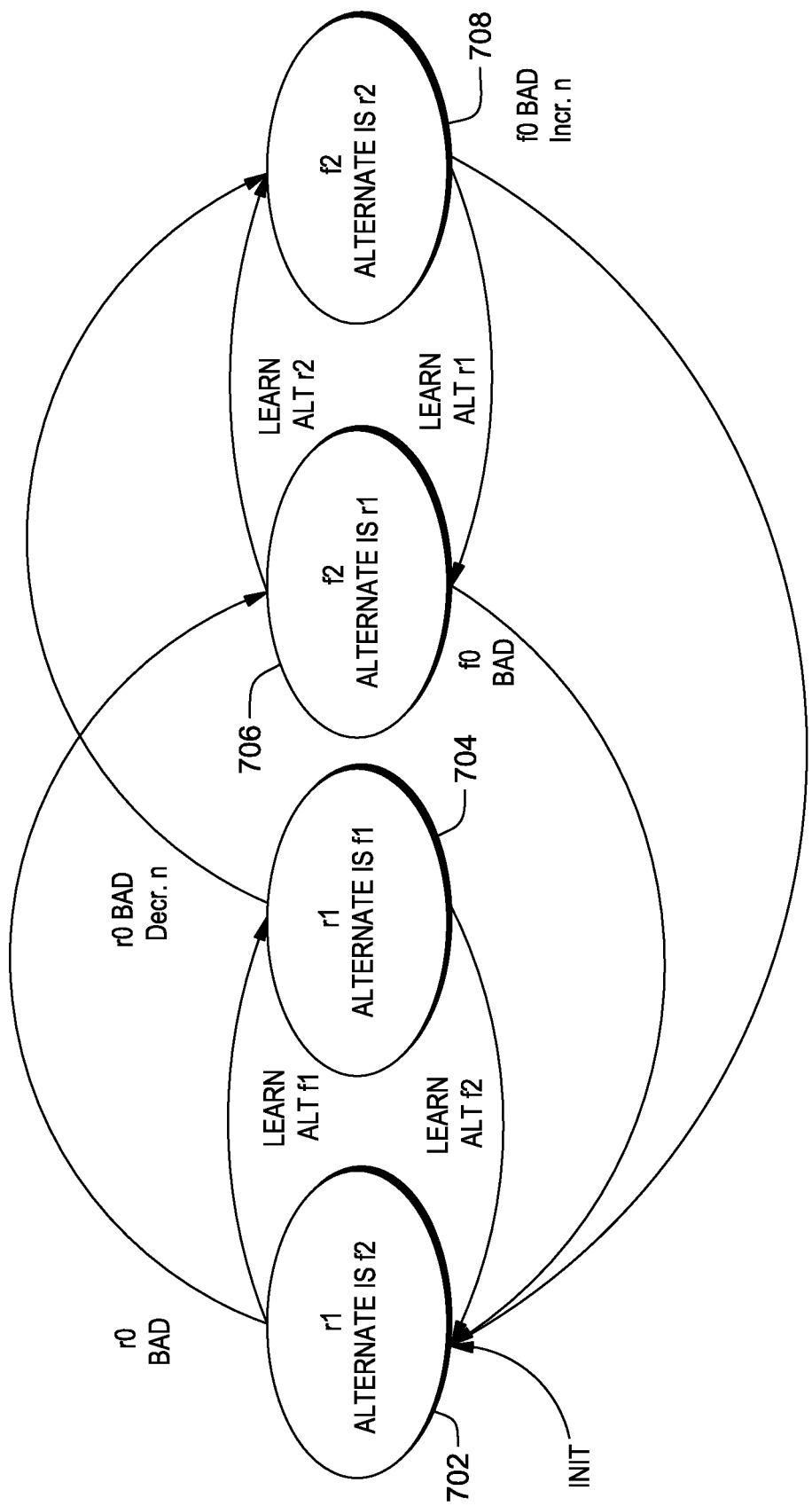
FIG. 7 shows a state transition diagram representing the possible states of an extended FSM, in accordance with an alternate embodiment of the present invention.

FIG. 7 shows a state transition diagram representing the possible states of extended FSM, in accordance with an alternate embodiment of the present invention. Arrows going back to the same state are not shown to reduce clutter. It is assumed that when a condition on a transition arrow is not true, the state is not changing.

When microprocessor 104 is powered on, extended FSM 114 is initialized to "r1 ALTERNATE IS f2", as shown in state 702. The choice of state 702 for initialization is arbitrary, and may instead be any one of states 704, 706, and 708.

If the current state is "r1 ALTERNATE IS f2", and r0_quality is bad, then the reading at r1 is transmitted to output 266, and on the next clock cycle, the state of extended FSM 114 becomes "f2 ALTERNATE IS r1", as shown with an arrow pointing from state 702 to state 706. The current sampling point stays at f2 as long as f0_quality remains good. With each clock cycle, extended FSM 114 learns which alternate is currently valid, i.e., "f2 ALTERNATE IS r1" OR "f2 ALTERNATE IS r2", as shown in the arrows between state 706 and 708. If the current state is "f2 ALTERNATE IS r1", and f0_quality is bad, then the reading at f2 is transmitted to output 266, and on the next clock cycle, the state of extended FSM 114 becomes "r1 ALTERNATE IS f2", as shown with an arrow pointing from state 706 to state 702. The current sampling point stays at r1 as long as r0_quality remains good. With each clock cycle, extended FSM 114 learns which alternate is currently valid, i.e., "r1 ALTERNATE IS f1" OR "r1 ALTERNATE IS f2", as shown in the arrows between state 702 and 704.

FIG. 7 differs from FIG. 6 at state 704 and 708. If the current state is "r1 ALTERNATE IS f1", and r0_quality is bad, then the reading at r1 is transmitted to output 266, and on the next clock cycle the counter is decremented, and the state of extended FSM 114 becomes "f2 ALTERNATIVE IS r2", with an arrow pointing from state 704 to state 708. If the current state is "f2 ALTERNATE IS r2", and f0_quality is bad, then the reading at f2 is transmitted to output 266, and on the next clock cycle the counter is incremented, and the state of extended FSM becomes "r1 ALTERNATIVE IS f2", with an arrow pointing from state 708 to state 702. The apparatus continues to switch sampling points and adjust the counter as needed throughout a transmission.

After a certain transmission time at a given drift, the ability to compensate for drift via the delay chain may be exhausted. To avoid this situation, the protocol layer will signal for a reset prior to reaching the maximum continuous transmission, and during a gap in the transmission, to allow extended FSM 114 to reset the counter to a position capable of compensating for drift in the next transmission. The counter may be reset to (num_latches−3)/2, towards the middle of the second delay chain, when nothing is known about the frequencies. If (frequency_receiver_clock>frequency_sender_clock), then the counter could be reset to (num_latches−3) knowing that the counter would mostly be decremented during a transmission. If (frequency_receiver_clock<frequency_sender_clock), then the counter could be reset to zero knowing that the counter would mostly be incremented during a transmission. After a reset, extended FSM 114, multiplexer 264, and any output may be suspended for a number of cycles to clear the second delay chain of the previous transmission. The number of cycles required to clear the second delay chain is related to the reset position, and would typically be (num_latches−3)/2.

Having described preferred embodiments for an apparatus and method for recovering a data signal by determining when to switch to an alternate sampling point within a digital signal, and by learning the best alternate sampling point (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

The methods described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

What is claimed is:

1. A computer processor for recovering a data signal of binary bits comprising:
   a data signal input wire and a data signal output wire;
   a clock generator to create an internal clock signal and an internal inverted clock signal;
   one or more data signal delay elements;
   a plurality of data storage elements;
   control logic, which when implemented: receives a data signal from the data signal input wire;
   receives an external clock signal, wherein the external clock signal differs from the internal clock signal with an unknown phase offset;
   samples a binary bit of the data signal multiple times per clock cycle forming at least a first and a second sampling group, wherein each sampling group includes more than one sample of the binary bit stored into more than one memory element;
   determines, for each sampling group, a sample and a quality measurement, wherein the sample is the stored sample from one of the more than one memory elements of each sampling group;
   stores, for each sampling group, the sample and the quality measurement into a set of memory elements;
   stores the sample from each of at least the first and the second sampling group into at least a first and a second delay chain respectively, wherein each delay chain includes at least three additional memory elements connected in series;
   determines a current sampling point, wherein the current sampling point is one of the at least three additional memory elements in one of at least the first and the second delay chain;
   determines an alternate sampling point, wherein the alternate sampling point is one of the at least three additional memory elements in one of at least the first and the second delay chain which samples the same binary bit in the data signal as the current sampling point; and transmits output corresponding to the current sampling point to the data signal output wire.

2. The computer processor of claim 1, further comprising the control logic, which when implemented:

determines the quality measurement of the sampling group is bad, wherein the quality measurement is bad when the stored samples from each of the more than one memory elements of a sampling group are sampled at a transition point;

issues, in a first clock cycle, outputs corresponding to the current sampling point;

switches, in a second clock cycle, the current sampling point to the alternate sampling point; and issues, in the second clock cycle, output corresponding to the alternate sampling point.

3. The computer processor of claim 1, wherein the control logic to sample a binary bit of the data signal multiple times per clock cycle forming at least a first and a second sampling group, comprises control logic, which when implemented:

captures into a first set of memory elements the first sampling group of at least three samples of the received data signal with sampling on one rising edge of an internal clock signal with a small delay between samples;

captures into a second set of memory elements the second sampling group of at least three samples of the received data signal with sampling on one rising edge of an inverted internal clock signal with the small delay between samples;

captures each of the at least three samples of each sampling group into a third set of memory elements using one internal clock signal to align the first and second sampling groups to a first clock cycle; and compares the at least three samples within each sampling group in the third set of memory elements to determine a quality measurement for each group, wherein the quality measurement is bad when the at least three samples within each sampling group do not match, the bad quality measurement indicating the detection of a transition point between binary bits in the data signal.

4. The computer processor of claim 1, wherein the control logic to store the sample from each of at least the first and the second sampling group into at least a first and a second delay chain respectively, comprises control logic, which when implemented:

transmits on a first clock cycle the stored sample of the first sampling group into the first memory element of the first delay chain of at least three additional memory elements connected in series;

transmits on the first clock cycle the stored sample of the second sampling group into the first memory element of the second delay chain of at least three additional memory elements connected in series; and transmits for at least the first and the second delay chains on the first clock cycle contents of a first memory element into a second memory element, and contents of the second memory element into a third memory element.

5. The computer processor of claim 1, wherein the control logic to determine a current sampling point, comprises control logic, which when implemented:

receives as input the stored quality measurement of at least the first and the second sampling group;

receives as input the stored sample of at least the first and the second sampling group;

receives as input content of the at least three additional memory elements of at least the first and the second delay chain corresponding to at least the first and the second sampling group; and determines through encoded logic the current sampling point, based at least in part on the stored quality measurements of at least the first and the second sampling group, and content of the at least three additional memory elements in at least the first and the second delay chain.

6. The computer processor of claim 1, wherein the control logic to determine an alternate sampling point, comprises control logic, which when implemented:

determines the current sampling group comprises the content of the memory elements corresponding to the current sampling point minus one clock cycle, the current sampling point, and the current sampling point plus one clock cycle;

determines the first alternate sampling group comprises the content of the memory elements corresponding to the current sampling point minus one-half clock cycle, the current sampling point plus one-half clock cycle, and the current sampling point plus one and one-half clock cycles;

determines the second alternate sampling group comprises the content of the memory elements corresponding to the current sampling point minus one and one-half clock cycles, the current sampling point minus one-half clock cycle, and the current sampling point plus onehalf clock cycle;

compares the content of the current sampling group with content of the first and the second alternate sampling groups;

determines the content of the current sampling group matches the content of the first alternate sampling group; and responsive to determining the content of the current sampling group matches the content of the first alternate sampling group, sets the middle sample of the first alternate sampling group to be the alternate sampling point.

7. The computer processor of claim 6, further comprising the control logic, which when implemented:

determines the content of the current sampling group matches the content of the second alternate sampling group; and responsive to determining the content of the current sampling group matches the content of the second alternate sampling group;

sets the middle sample of the second alternate sampling group to be the alternate sampling point.

8. The computer processor of claim 1, further comprising the control logic, which when implemented:

resets the current sampling point to a middle memory element of the delay chain upon receiving a signal from a transmission protocol layer, wherein the signal indicates an upcoming gap in the received data signal.

9. The computer processor of claim 1, further comprising the control logic, which when implemented: receives the external clock signal, wherein the external clock signal differs from the internal clock signal by a small difference in frequency.

10. The computer processor of claim 1, further comprising:

a first plurality of wires connecting the at least the first and the second delay chain to both a finite state machine and a multiplexer;

a second plurality of wires connecting the set of memory elements containing the stored sample and the stored quality measurement for each sampling group to the finite state machine;

a third plurality of wires connecting the finite state machine to the multiplexer;
the multiplexer connected to the data signal output wire; and
sequential logic of the finite state machine, which when implemented: selects a memory element from the at least the first and the second delay chain as the current sampling point;
selects a memory element from the at least the first and the second delay chain as the alternate sampling point;
responsive to detection of a transition point, switches from the current sampling point to the alternate sampling point in the next clock cycle;
determines an output gate of the multiplexer which relates to the current sampling point; and
transmits a control signal to the connected multiplexer to open the output gate.

* * * * *